April 30, 1957

H. S. LINK ET AL 2,790,347

MICROSCOPE ATTACHMENT FOR PROJECTING
RATING CHART INTO FIELD OF VISION

Filed Aug. 20, 1953

INVENTORS:
HAROLD S. LINK and
KENNETH J. STODDEN,

BY: *Donald G. Dalton*

Their Attorney.

United States Patent Office 2,790,347  
Patented Apr. 30, 1957

2,790,347

MICROSCOPE ATTACHMENT FOR PROJECTING RATING CHART INTO FIELD OF VISION

Harold S. Link, Pleasant Hills, and Kenneth J. Stodden, Verona, Pa., assignors to United States Steel Corporation, a corporation of New Jersey Application August 20, 1953, Serial No. 375,497

5 Claims. (Cl. 88—14)

This invention relates to an attachment for microscopes, particularly one for projecting a chart into the field of vision.

An observer through a microscope often wishes to rate various features of a specimen by comparing them with a standard chart. For example, in metallographic work the grain size of a specimen conveniently can be determined by comparing its grains with standard sizes shown on a rating chart. Similar procedures also can be used for determining other features of a metallic specimen, such as the number, size and distribution of nonmetallic inclusions and carbides, or the proportions of microconstituents.

An object of the present invention is to provide a simple microscope attachment which projects a rating chart into the actual field of vision and thereby eliminates any need for an observer to look away from the specimen to make a comparison, or for more elaborate equipment, such as a metallographic microscope.

A further object of the invention is to provide an attachment of the foregoing type in which the distance between the eyepiece and the chart can be varied to determine fractional sizes intermediate the standard sizes on the chart.

A further object is to provide an attachment which affords the foregoing advantages and yet can be installed on a standard microscope and used in an undarkened room.

Figure 1:
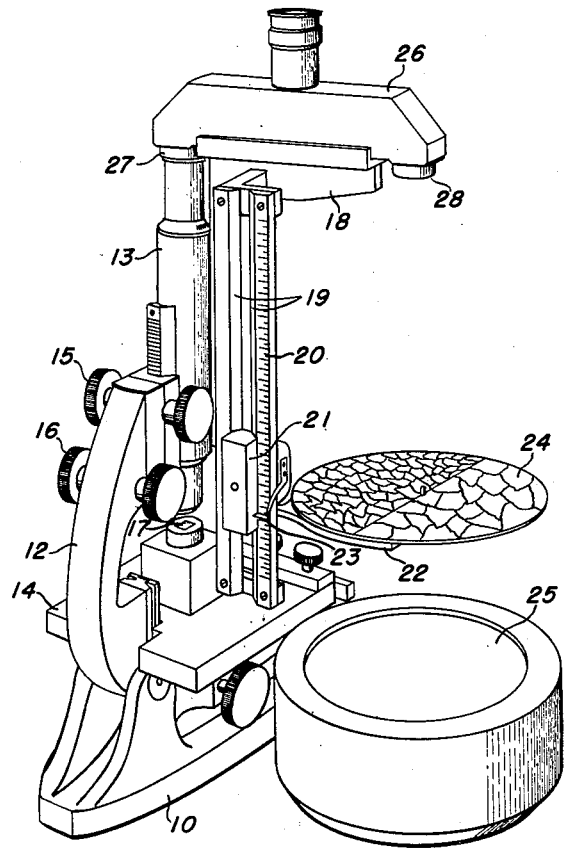
Figure 2:
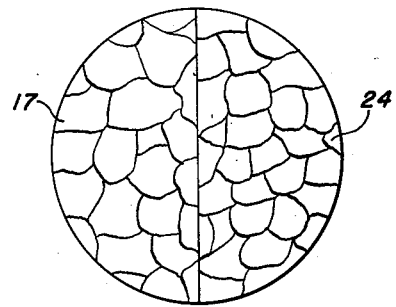

In accomplishing these and other objects of the invention, we have provided improved details of structure, a preferred form of which is shown in the accompanying drawing, in which:

Figure 1 is a perspective view of a microscope equipped with an attachment that embodies features of our invention; and Figure 2 is a plan view of a typical observation through a microscope equipped with our attachment.

Figure 1 shows a desk-type microscope 10 which can be of any standard or desired construction. The microscope illustrated includes a frame 12, a monocular body tube 13 and a stage 14. The tube 13 can be raised and lowered relative to the stage 14 through coarse and fine adjustment screws 15 and 16. The stage 14 supports a specimen 17, such as a body of metal whose surface has been polished and etched.

In accordance with our invention, a bracket 18 is clamped or otherwise secured to one side of the body tube 13 adjacent the upper end, and is movable vertically therewith as the tube is adjusted. The bracket supports a slideway 19 which bears a graduated scale 20. A block 21 is mounted for vertical movement in said slideway and carries a chart table 22 and an indicator 23 cooperable with scale 20. The chart table 22 carries a rating chart 24 which is rotatable thereon, and on its upper face depicts several standards for comparison with specimens, for example, several standard sizes of grains for metallographic work. The chart is illuminated from any suitable light source, such as that indicated at 25.

A comparison eyepiece 26 is mounted on the bracket 18 and has a first opening 27 situated over the tube 13 and a second opening 28 situated over the chart 24. This eyepiece includes the usual arrangement of prisms so that the observer views both the specimen 17 and the chart 24. The observation appears somewhat as shown in Figure 2, with the image of the specimen and the image of the chart each occupying approximately half the field of vision. The details of the eyepiece are not shown, since such devices are well known and per se are not part of our invention.

In operation, the observer focuses the microscope 10 on the specimen 17 in the usual way. The distance between the openings 28 of the comparison eyepiece 26 and the chart 24 remains the same throughout any focusing adjustments, since these parts move with the tube 13 of the microscope. The chart 24 then is rotated to bring the section thereof which is most like the specimen into the field of vision of the microscope. In the example of grain size determination, the chart table 22 next is adjusted vertically along the slideway 19 until the grain sizes on the chart appear the same as those on the specimen. The chart can show A. S. T. M. standard grain sizes, while the position of the table 22, as shown by the indicator 23 and scale 20, determines intermediate fractional sizes. It follows that this scale can be calibrated in such sizes, or alternatively in standard linear units such as centimeters, and the size can be computed from an appropriate graph.

It is apparent that our attachment can be modified in a number of ways. For example, for some purposes the vertical adjustment feature of the chart table and chart is unnecessary, and the attachment can be simplified by fixing the table with respect to the bracket. Conversely when greater precision is required in the adjustability of these parts, a more refined mechanism, such as a rack and pinion, can be added. Therefore, we do not wish to be limited by our specific disclosure, but only by the scope of the appended claims.

We claim:

1. A device for determining grain size of metallographic specimens comprising a monocular microscope having a stage for supporting a specimen and a tube movable relative to said stage, a support attached to the outside of said tube and bearing a linear scale, a block mounted on said support for sliding adjustment along said scale, a grain size rating chart carried by said block and bearing representations of grains of a definite size, a comparison eyepiece mounted on said support and having an opening over said tube and another opening over said chart so that the field of vision therethrough is occupied approximately half by the specimen and half by the chart, and means for illuminating said chart, whereby the grains of the specimen can be matched approximately with the representations on the chart by proper chart selection and matched accurately by adjustment of said block along said scale.

2. A device for determining grain size of metallographic specimens comprising a monocular microscope having a stage for supporting a specimen and a tube movable relative to said stage, a bracket and a depending slideway attached to the outside of said tube, said slideway bearing a linear scale, a block mounted on said slideway for sliding adjustment along said scale toward and from said bracket, a chart table carried by said block, a grain size rating chart carried by said table and bearing representatives of grains of a definite size, a comparison eyepiece mounted on said support and having an opening over said tube and another opening over said chart so that the field of vision therethrough is occupied approximately half by the specimen and half by the chart, and means for illuminating said chart, whereby the grains of the specimen can be matched approximately with the representations on the chart by proper chart selection and matched accurately by adjustment of said block along said scale.

3. A device as defined in claim 2 in which said chart has different grain size representations in different areas and is rotatably supported on said table to bring its different areas into view through said eyepiece.

4. An attachment for a monocular microscope to adapt the microscope for determining grain size of metallographic specimens, comprising a horizontal bracket; a slideway fixed to and depending from said bracket and bearing a linear scale, said bracket and slideway being adapted for attachment to the side of a microscope tube, a block mounted on said slideway for sliding adjustment along said scale toward and from said bracket, a chart table carried by said block, and a grain size rating chart carried by said table and bearing representations of grains of a definite size, said bracket being adapted to support a comparison eyepiece with one of its openings over the microscope tube and the other over said chart.

5. An attachment as defined in claim 4 in which said chart has different grain size representations in different areas and is rotatably supported on said table to bring its different areas into position to be viewed through the eyepiece.

References Cited in the file of this patent

UNITED STATES PATENTS

| | | |
|---|---|---|
| 2,040,066 | Ursinus | May 5, 1936 |
| 2,510,145 | Short | June 6, 1950 |
| 2,674,152 | Wilkinson | Apr. 6, 1954 |

FOREIGN PATENTS

| | | |
|---|---|---|
| 21,086 | Great Britain | of 1911 |